United States Patent
Speziali (10) Patent No.: US 12,523,268 B2
(45) Date of Patent: Jan. 13, 2026

(54) ELECTROMECHANICAL DRIVE

(71) Applicant: TRUMPF Maschinen Austria GmbH & Co. KG., Pasching (AT)

(72) Inventor: Stefano Speziali, Foligno (IT)

(73) Assignee: TRUMPF Maschinen Austria GmbH & Co. KG., Pasching (AT)

(*) Notice: Subject to any disclaimer, the term of this patent is extended or adjusted under 35 U.S.C. 154(b) by 399 days.

(21) Appl. No.: 18/277,671

(22) PCT Filed: Feb. 22, 2022

(86) PCT No.: PCT/AT2022/060048
§ 371 (c)(1),
(2) Date: Aug. 17, 2023

(87) PCT Pub. No.: WO2022/178563
PCT Pub. Date: Sep. 1, 2022

(65) Prior Publication Data
US 2024/0133438 A1 Apr. 25, 2024
US 2024/0229882 A9 Jul. 11, 2024

(30) Foreign Application Priority Data

Feb. 23, 2021 (AT) .............................. A50122/2021

(51) Int. Cl.
*F16D 65/18* (2006.01)
*F16D 55/226* (2006.01)
(Continued)

(52) U.S. Cl.
CPC .......... *F16D 65/18* (2013.01); *F16D 55/226* (2013.01); *F16D 2121/24* (2013.01); *F16D 2125/40* (2013.01)

(58) Field of Classification Search
CPC .... F16D 55/226; F16D 65/18; F16D 2121/24; F16D 2121/16; F16D 2121/20;
(Continued)

(56) References Cited

U.S. PATENT DOCUMENTS 3,161,074 A * 12/1964 Korthaus ................. B61G 9/18
74/89.34
4,684,838 A * 8/1987 Casanova ............ H02K 7/1025
188/71.1
(Continued)

FOREIGN PATENT DOCUMENTS

CN 110067824 A 7/2019
DE 1 190 759 B 4/1965
(Continued)

OTHER PUBLICATIONS

International Search Report in PCT/AT2022/060048, mailed Jun. 20, 2022.

Primary Examiner — Henry Y Liu
(74) Attorney, Agent, or Firm — Collard & Roe, P.C.

(57) ABSTRACT

An electromechanical drive includes a motor, a rotational part rotatable by the motor about a rotational axis, and a braking device that can be actuated between a braking position and a released position, the braking device having a brake disc that rotates with the rotational part and a braking element that can be adjusted in the axial direction and acts on the brake disc in the braking position. The brake disc has an inner area, a friction surface area extending annularly around the rotational axis with a first friction surface formed on a first side of the brake disc, and an intermediate area extending between the friction surface area and the inner area around the rotational axis. A first mating surface is formed on the braking element, which mating surface faces
(Continued)

the first friction surface and interacts with the first friction surface in the braking position.

21 Claims, 8 Drawing Sheets

(51) Int. Cl.
*F16D 121/24* (2012.01)
*F16D 125/40* (2012.01)

(58) Field of Classification Search
CPC .... F16D 2125/40; F16D 65/186; F16D 55/28; F16D 55/22; F16D 65/092; F16D 65/123; F16D 2065/024; F16D 2065/1348; F16D 2121/22; F16H 25/2454; H02K 7/06; H02K 7/1025; B30B 1/18; B30B 15/10; B21D 5/00
See application file for complete search history.

(56) References Cited

U.S. PATENT DOCUMENTS

| | | | | |
|---|---|---|---|---|
| 5,125,280 | A * | 6/1992 | Koscinski | F16H 25/2015 74/89.4 |
| 5,394,288 | A * | 2/1995 | Nishida | H02H 7/0853 361/23 |
| 8,256,311 | B2 * | 9/2012 | Payne | H02K 11/24 74/89.37 |
| 8,567,272 | B2 * | 10/2013 | Hyun | F16H 29/02 74/89.34 |
| 8,662,263 | B2 * | 3/2014 | Deutloff | B60T 13/746 188/162 |
| 8,692,428 | B2 * | 4/2014 | Miyairi | H02K 7/06 310/80 |
| 8,904,890 | B2 * | 12/2014 | Park | F15B 15/084 74/89.33 |
| 9,211,877 | B2 * | 12/2015 | Deutloff | F16D 65/28 |
| 9,234,550 | B2 * | 1/2016 | Lee | F16D 28/00 |
| 9,581,212 | B2 * | 2/2017 | Roos | B60T 13/746 |
| 9,605,464 | B2 * | 3/2017 | Kessler | H02K 1/17 |
| 9,873,411 | B2 * | 1/2018 | Deutloff | F16D 65/28 |
| 10,071,718 | B2 * | 9/2018 | Deutloff | B60T 7/107 |
| 10,939,433 | B2 * | 3/2021 | Au | H04L 1/1864 |
| 11,035,743 | B2 * | 6/2021 | Paine | H02K 7/06 |
| 12,338,934 | B2 * | 6/2025 | Giles | F16L 55/132 |
| 2005/0081660 | A1 * | 4/2005 | Migliori | F16H 25/20 74/25 |
| 2007/0220998 | A1 * | 9/2007 | Kopecek | B64C 13/28 74/89.38 |

FOREIGN PATENT DOCUMENTS

| | | |
|---|---|---|
| DE | 1 284 725 B | 12/1968 |
| DE | 10 2009 009 395 A1 | 8/2010 |
| DE | 10 2019 004 953 A1 | 1/2021 |
| EP | 0 209 943 A1 | 1/1987 |
| EP | 0 521 840 A2 | 1/1993 |
| EP | 1 524 455 A2 | 4/2005 |
| EP | 2 333 380 A1 | 6/2011 |
| GB | 1 194 740 A | 6/1970 |
| JP | S52-129885 A | 10/1977 |
| JP | S58-15448 A | 1/1983 |
| JP | S61-188042 U | 11/1986 |
| JP | S62-20923 A | 1/1987 |
| JP | H01-188728 A | 7/1989 |
| JP | H01-035078 Y2 | 10/1989 |
| JP | H03-094432 U | 9/1991 |
| JP | H05-008066 U | 2/1993 |
| JP | 2002-254199 A | 9/2002 |
| JP | 2015-036568 A | 2/2015 |
| SU | 1467275 A1 | 3/1989 |
| WO | 2007/094073 A1 | 8/2007 |

\* cited by examiner

ELECTROMECHANICAL DRIVE

CROSS REFERENCE TO RELATED APPLICATIONS

This application is the National Stage of PCT/AT2022/060048 filed on Feb. 22, 2022, which claims priority under 35 U.S.C. § 119 of Austrian Application No. A50122/2021, filed on Feb. 23, 2021, the disclosure of which is incorporated by reference. The international application under PCT article 21(2) was not published in English.

The invention relates to an electromechanical drive according to the preamble of claim 1. The invention relates also to a forming machine with a press drive.

EP1524455A2 discloses, in connection with an electrically actuated linear actuator in the form of a spindle drive, a braking device comprising an axially movable first clutch disc and a second clutch disc cooperating with the drive shaft via a hub. The first clutch disc presses the second clutch disc against a third clutch disc. By actuating a coil, the first clutch disc is moved into a releasing position so that the second clutch disc can rotate with the drive shaft.

EP2333380A1 also discloses, in connection with a linear actuator a braking device with a rotating brake disc and a stationary brake disc which is movable relative to the rotating brake disc and enables braking the drive shaft by friction.

The disadvantages resulting from the prior art are in particular that the braking effect, especially the braking torque or braking force, is too low for certain applications. The braking process, i.e. the time that elapses between actuation of the braking device and the braking effect (e.g. standstill of the drive or braking to a desired level), is often too long.

The object of the present invention was to overcome the disadvantages of the prior art and to provide an electromechanical drive with which an immediate and rapid braking effect can be achieved. Likewise, the braking effect and the efficiency of the braking process are to be increased. This is particularly intended to increase safety in applications where operators work or handle in the danger zone and drives must therefore come to an immediate standstill under certain conditions. The reliability, performance and usability of an electromechanical drive in a wide range of applications is to be increased by improving the braking device.

This task is solved by an electromechanical drive of the type mentioned at the beginning in that the brake disk has
an inner area,
a friction surface area extending annularly around the rotational axis with a first friction surface formed on a first side of the brake disc, and
an intermediate area extending between the friction surface area and the inner area around the rotational axis,
and in that a first mating surface is formed on the braking element, which mating surface faces the first friction surface and interacts with the first friction surface in the braking position.

The braking element does not rotate with the rotational part. In other words, the braking element is stationary with respect to the rotation of the rotational part or the brake disc that is rotationally connected to the rotational part. The braking element exerts a braking effect in the braking position by frictional engagement with the brake disc. According to the invention, the friction surface area is located outside the inner area in the radial direction and also outside the intermediate area. While the inner area can serve as a attachment area (for attachment to the rotational part), the intermediate area is preferably designed to be deformable. It is preferred if the inner area and the intermediate area are not in contact with the braking element even in the braking position. The braking effect is highest in the peripheral area. On the one hand, the speed is greatest there, and on the other hand, the greatest braking torque can be applied there.

The braking element may be moved in the axial direction from the released position to the braking position. This movement reduces the brake gap until the braking element presses with its first mating surface against the first friction surface of the brake disc.

The braking torque is transmitted to the rotational part via the areas located radially further inwards (inner area and intermediate area).

The brake disc may be axially fixed with its inner area relative to the rotational part. In the braking position, the braking element presses against the friction surface area further out, exerting a deforming force on the brake disc. The latter wants to bend in the axial direction.

The rotational part may be, for example, a drive shaft, a threaded nut (e.g. in a spindle drive), a rotor (of an electric motor) or any rotating element of a drive train.

A preferred embodiment is characterised in that the intermediate region of the brake disc, both in the released position and in the braking position, is free of contact with the braking element and/or that in the braking position the contact of the braking element with the brake disc is limited to the first friction surface. This measure ensures that the frictional connection only occurs in the area of the friction surface area, while the inner area and the intermediate area do not come into direct contact with the braking element. In particular, the intermediate area can thus take on an additional functionality.

A preferred embodiment is characterised in that the intermediate area is a deformation area that is elastically deformable in the axial direction by the action of the braking element on the brake disc. In contrast to known solutions, the brake disc may be axially fixed to the rotational part. A rigid connection between the brake disc and the rotational part may be provided. This increases the braking effect; in particular the braking force is transmitted directly to the rotational part.

A preferred embodiment is characterised in that cut-outs, preferably in the form of perforations, and/or material weakenings are formed in the deformation area. The degree of deformability can be determined by the number of cut-outs and optimised for different areas of application. Alternatively, the deformation area may also be characterised by a lower material thickness compared to the inner area and/or friction surface area.

A preferred embodiment is characterised in that in the deformation area the total area of the cut-outs is at least as large as the total area occupied by the remaining material. This ensures sufficient deformation, especially if the friction surface area is pressed against a second mating surface in the braking position.

A preferred embodiment is characterised in that the friction surface area comprises a second friction surface formed on the second side of the brake disc opposite to the first side, and in that the friction surface area of the brake disc is arranged between the first mating surface and a second mating surface facing the second friction surface and cooperating with the second friction surface in the braking position. In the released position of the braking device, a brake gap is formed between the respective interacting surfaces. By means of a deformable intermediate area, it can be elegantly ensured, and as an alternative to an axial displaceability of the brake disc relative to the rotational part, that the brake gap(s) are closed over the entire surface by a deformation of the brake disc in the axial direction.

A preferred embodiment is characterised in that the first mating surface is annular and/or that the second mating surface is annular.

A preferred embodiment is characterised in that the friction surface area is arranged in the periphery of the brake disc, preferably the first friction surface and/or the second friction surface extending to the outer edge of the brake disc. As already mentioned, the braking effect is greatest in the outermost area of the brake disc.

A preferred embodiment is characterised in that the difference between the outer radius and the inner radius of the friction surface area is at most ⅓, preferably at most ¼, of the outer radius of the brake disc.

A preferred embodiment is characterised in that the electromechanical drive has a housing and that the second mating surface is formed on a housing part or on an element firmly connected to the housing part. This measure allows the braking torque to be introduced directly into the (stationary) housing. The braking energy given off in the form of heat can also pass into the housing, which means that there is no need for a complex brake cooling, as the heat can be conducted directly to the outside via the housing.

A preferred embodiment is characterised in that the inner region of the brake disc has at least one, preferably several, preferably annularly arranged, attachment interfaces, preferably in the form of holes, for attaching the brake disc to the rotational part, the number of attaching interfaces preferably being greater than 10 and/or greater than the number of cut-outs in the deformation area. A rigid connection between the brake disc and the rotational part is particularly preferred here, which can be ensured by screws, for example.

A preferred embodiment is characterised in that in the released position of the braking device, the first friction surface and the first mating surface deviate from a parallel alignment and/or in that in the released position of the braking device, the second friction surface and the second mating surface deviate from a parallel alignment. With this measure, for example, the pressure can be reduced at a portion of the friction surface area disposed more to the inner side, while it can be increased in a portion relative to it disposed more to the outer side. This allows for a more even distribution of pressure if the friction or mating surface(s) (or brake gap) are appropriately dimensioned. This reduces wear and increases service life. These advantages can also be achieved, for example, by the following preferred embodiments.

A preferred embodiment is characterised
in that the distance between the first friction surface and the first mating surface decreases in the radial direction, this distance preferably being smaller at the radially outer edge of the first friction surface by at most 1 mm, preferably by at most 0.2 mm, than at the radially inner edge of the first friction surface,
and/or in that the distance between the second friction surface and the second mating surface decreases in the radial direction, this distance preferably being smaller at the radially outer edge of the second friction surface by at most 1 mm, preferably by at most 0.2 mm, than at the radially inner edge of the second friction surface.
In the braking position, the pressure is reduced at a portion of the friction surface area disposed more to the inner side, while it is increased in a portion relative to it disposed more to the outer side. In addition, an adaptation to a brake disc which bends in the axial direction during the braking process can be made to a certain extent.

A preferred embodiment is characterised in that, in the released position of the braking device, the first friction surface and the first mating surface are inclined towards each other and/or that in the released position of the braking device the second friction surface and the second mating surface are inclined towards each other.

A preferred embodiment is characterised in that the first friction surface and/or the first mating surface have a curved shape in the radial direction and/or that the second friction surface and/or the second mating surface have a curved shape in the radial direction.

A preferred embodiment is characterised in that the inner area of the brake disc is axially fixed to the rotational part and/or that the inner area of the brake disc is rigidly connected to the rotational part, preferably by screws.

A preferred embodiment is characterised in that a first spacer ring is arranged between the inner region of the brake disc and the rotational part, wherein preferably the inner region of the brake disc is constrained between the first spacer ring and a second spacer ring, preferably by screws. The spacer ring(s) can be used to adjust or optimise the relative position of the friction surface(s) relative to the mating surface(s). They also ensure an even distribution of pressure.

A preferred embodiment is characterised in that the electromechanical drive is a spindle drive, wherein the rotational part to which the brake disc is connected is configured as a threaded nut which cooperates with the spindle of the spindle drive.

A preferred embodiment is characterised in that the brake disc has a disc-shaped base body and that the first friction surface and/or the second friction surface are formed by a preferably annular brake lining which is applied to the base body and/or projects in the axial direction beyond the base body.

A preferred embodiment is characterised in that the braking element is biased towards the braking position. The braking position can therefore be held here by passive (spring) elements independently of actuation or energisation.

A preferred embodiment is characterised in that the braking element is biased in the direction of the braking position by a plurality of springs which are arranged annularly and preferably overlapping with the first mating surface.

A preferred embodiment is characterised in that the springs are inserted in a removable housing part of the electromechanical drive.

A preferred embodiment is characterised in that the braking device comprises an actuator, preferably in the form of an electromagnet, by means of which the braking element can be brought into the released position and/or into the braking position, the actuator preferably being inserted in a removable housing part of the electromechanical drive. Such a variant has the advantage that in the event of a power failure or a control fault, the electromagnets are de-energised and the braking device automatically assumes the braking position.

A preferred embodiment is characterised in that the motor and the braking device are disposed in a common housing. This increases the immediate character of the braking effect, as braking takes place in the immediate area of engine torque generation.

The object is also achieved with a forming machine, in particular a bending machine, preferably a bending press, with at least one drive for the working movement, in particular a press drive, wherein the at least one drive is an electromechanical drive according to the invention. Such a forming machine may comprise a first (e.g. upper) tool carrier and a second (e.g. lower) tool carrier whose relative movement is the working movement. The electromechanical drive described above is particularly well suited for use in a forming machine, as the proposed braking device reacts in a particularly prompt way, thus reliably protecting the operating personnel in particular (especially in cases where a shutdown or a stop/slowdown of the working movement is relevant for safety) but also "protecting" workpieces from incorrect or faulty machining routines.

For the purpose of better understanding of the invention, this will be elucidated in more detail by means of the figures below.

These show respectively in a very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

Figure 1:
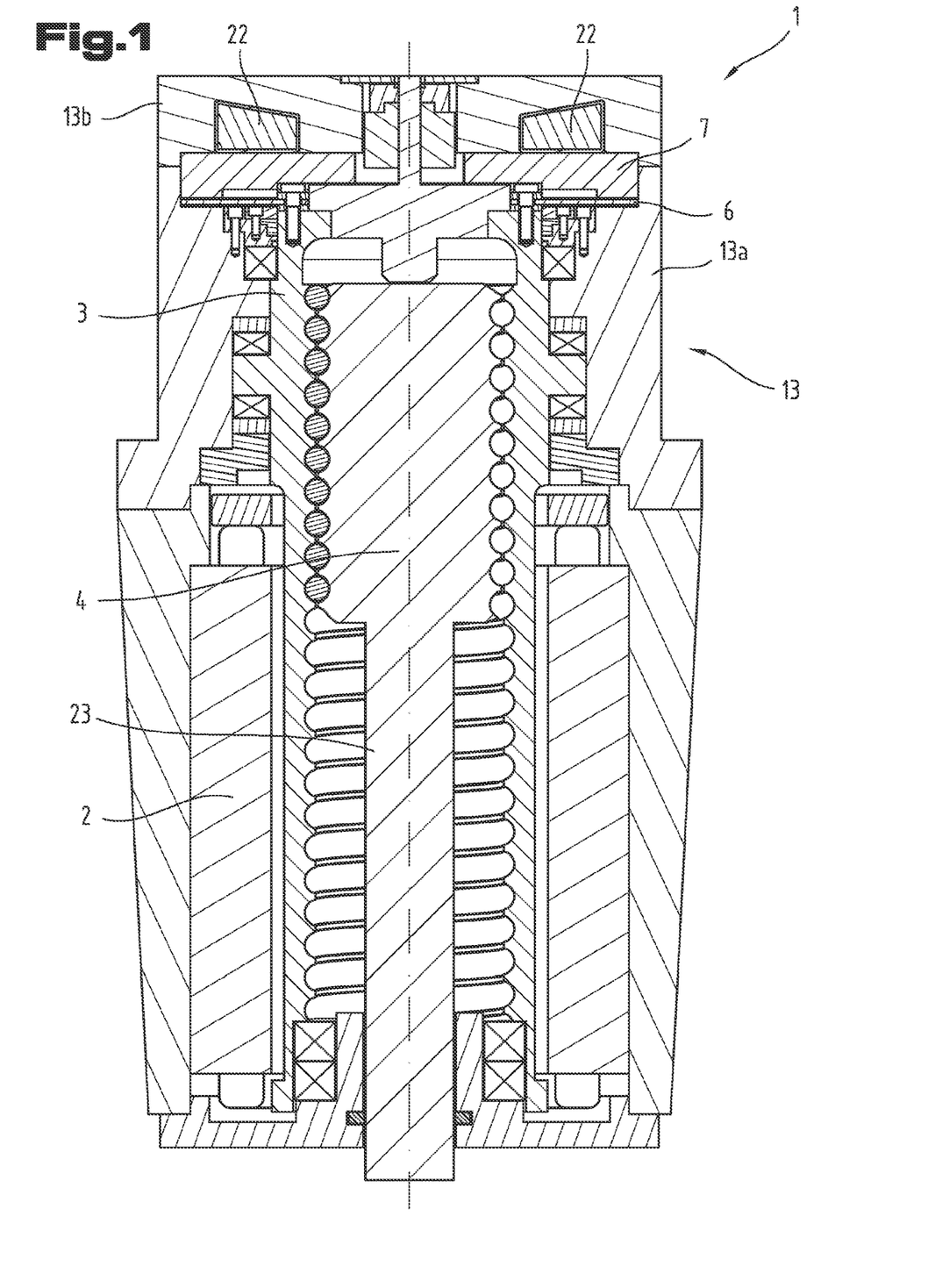
FIG. 1 an electromechanical drive in a cut view.

FIG. 1 shows an electromechanical drive 1 comprising a motor 2 and a rotational part 3 which can be set in rotation about a rotational axis 4 by the motor 2. The motor has a stator 2a, which is mounted on the inside of the housing 13 (e.g. in the form of windings), and a rotor 2b, which is arranged directly on the rotational part 3 (e.g. in the form of permanent magnets).

The electromechanical drive 1 further comprises a braking device 5 that can be actuated between a braking position and a released position. The braking device 5 has a brake disc 6 that rotates with the rotational part 3 and a braking element 7 that is adjustable in the axial direction and acts on the brake disc 6 in the braking position (see also FIGS. 2 and 3).

Figure 4:
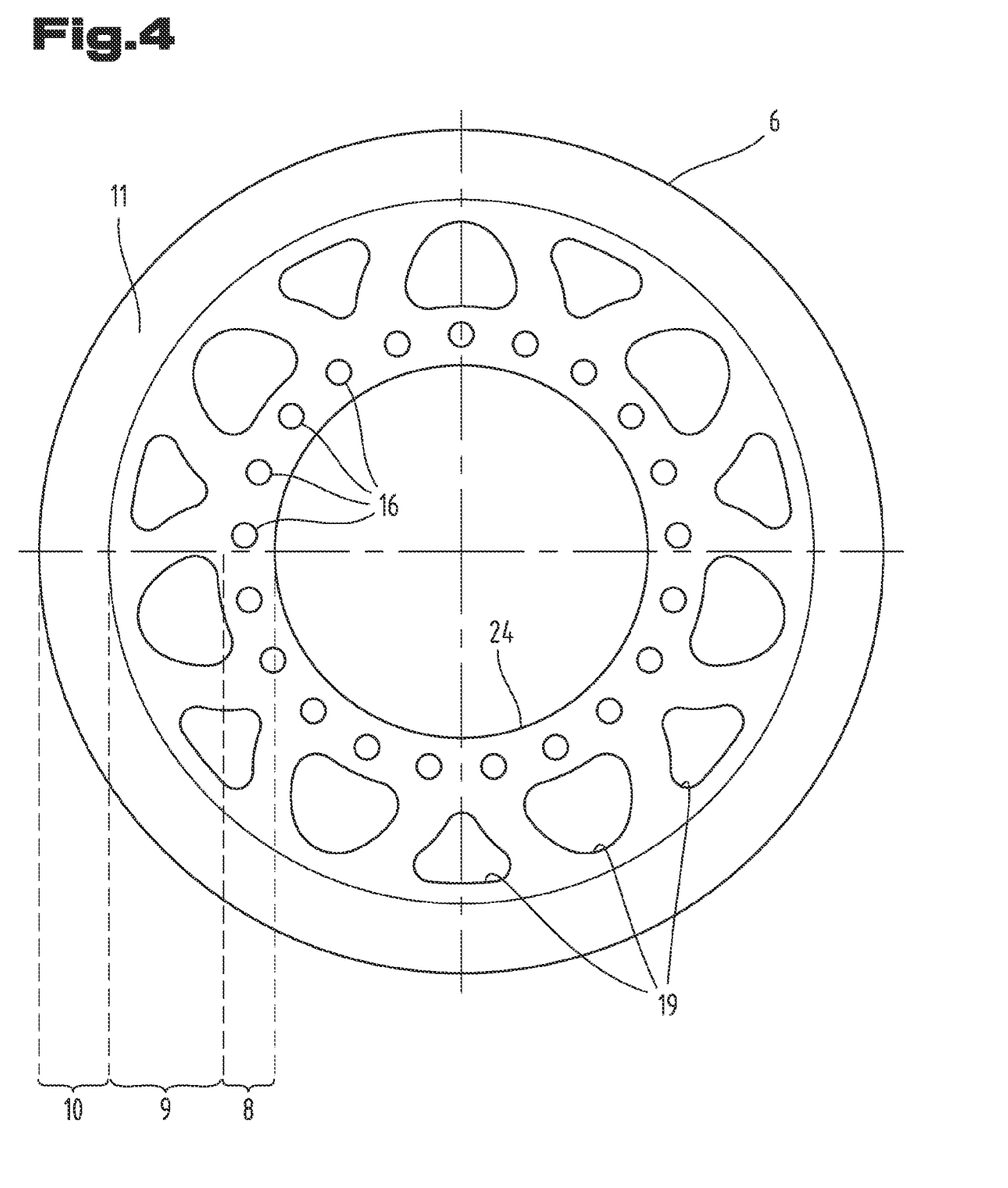
FIG. 4 a brake disc.

It can be seen from FIG. 4 that the brake disc 6 may have
an inner area 8,
a friction surface area 10 extending annularly around the rotational axis 4 with a first friction surface 11 configured on a first side of the brake disc 6, and
an intermediate area 9 extending between the friction surface area 10 and the inner area 8 around the rotational axis 4.

A first mating surface 17 is configured on the braking element 7, which faces the first friction surface 11 and interacts with the first friction surface 11 in the braking position.

Preferably, the motor 2 and the braking device 5 are housed in a common housing 13.

In the preferred embodiment shown, the intermediate area 9 of the brake disc 6, both in the released position and in the braking position, has no contact with the braking element 7. In the braking position, the contact of the braking element 7 with the brake disc 6 is limited to the first friction surface 11 (see FIGS. 2, 7 and 9). As can also be seen, for example, in FIG. 5, the areas of the braking element 7 adjacent to the first mating surface 17 may be set back behind the mating surface 17.

Figure 7:
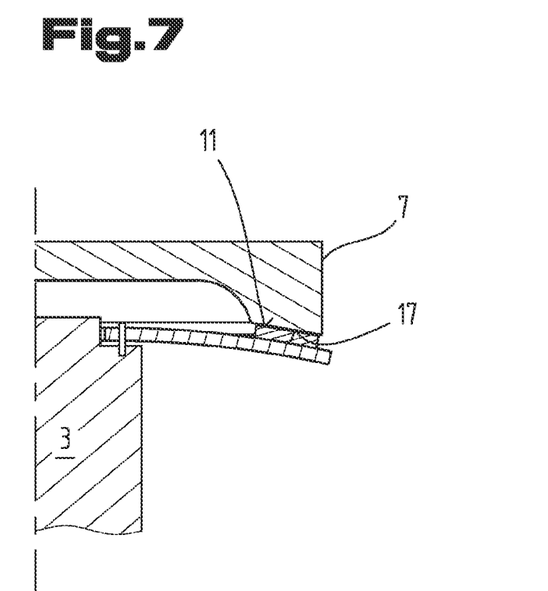
FIG. 7 a braking device in the released position.
Figure 9:
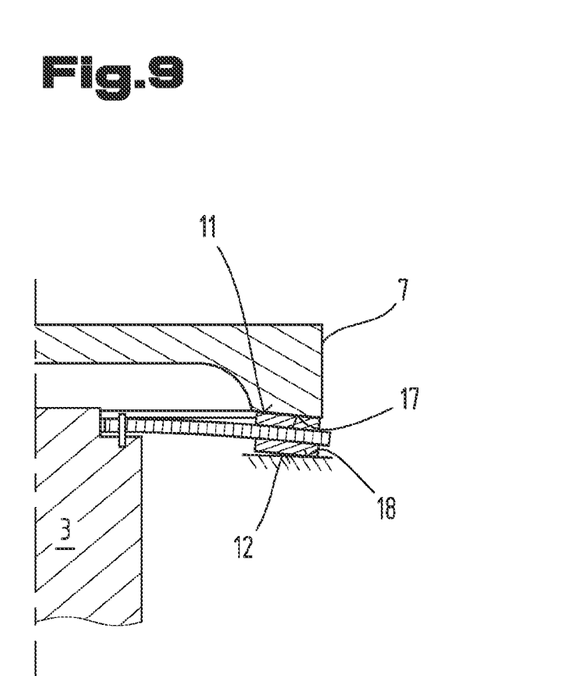
FIG. 9 a braking device with a second braking and mating surface in released position.

In the preferred embodiment of the brake disc 6 shown in FIG. 4, the intermediate area 9 is a deformation area which is elastically deformable in the axial direction by the action of the braking element 7 on the brake disc 6 (see FIGS. 7 and 9).

In the deformation area, as shown in FIG. 4, cut-outs 19, preferably in the form of perforations, and/or material weakenings may be formed. It is preferred if, in the deformation area, the total area of the cut-outs 19 is at least as large as the total area occupied by the remaining material.

Figure 5:
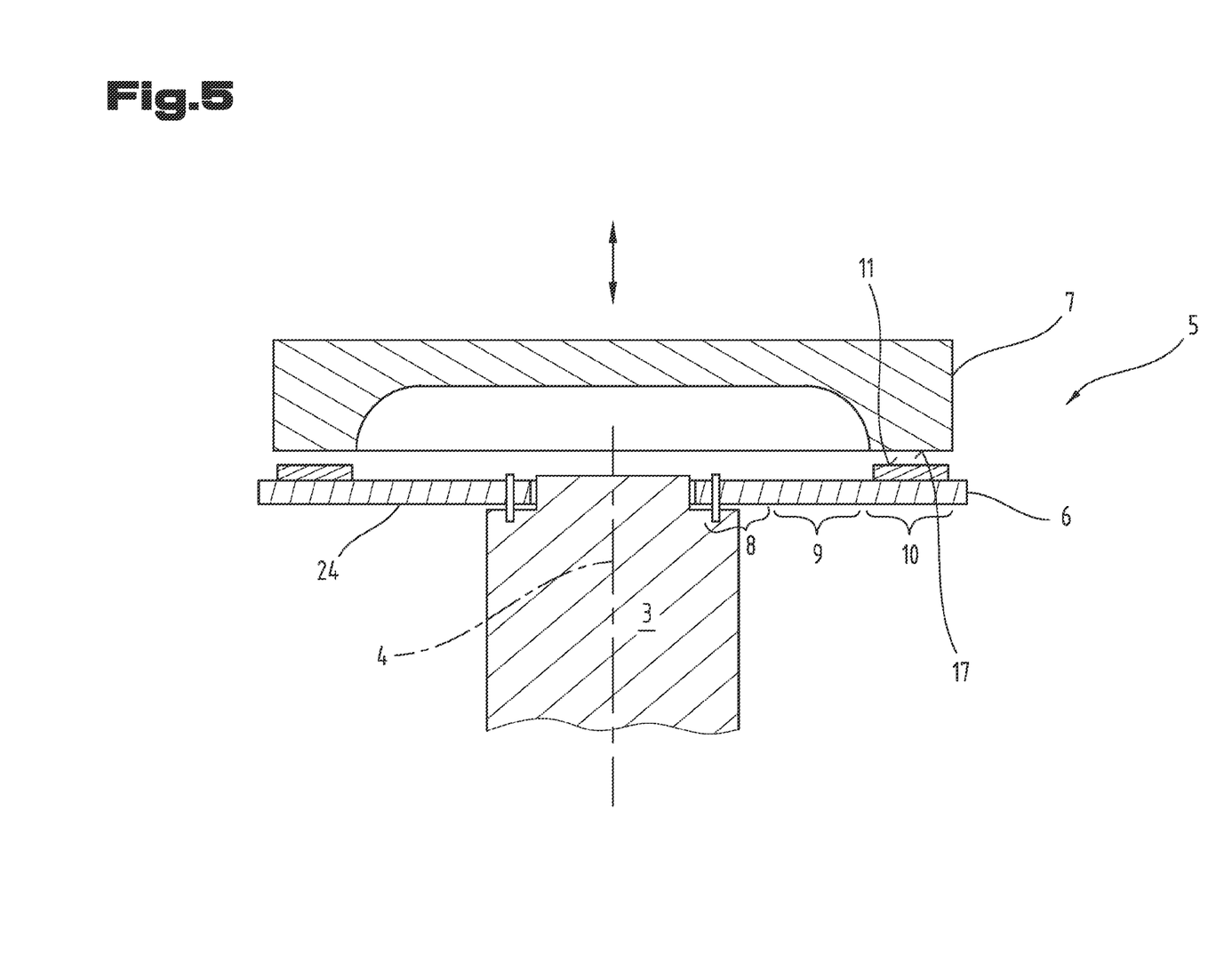
FIG. 5 the interaction of the braking element and the brake disc.
Figure 6:
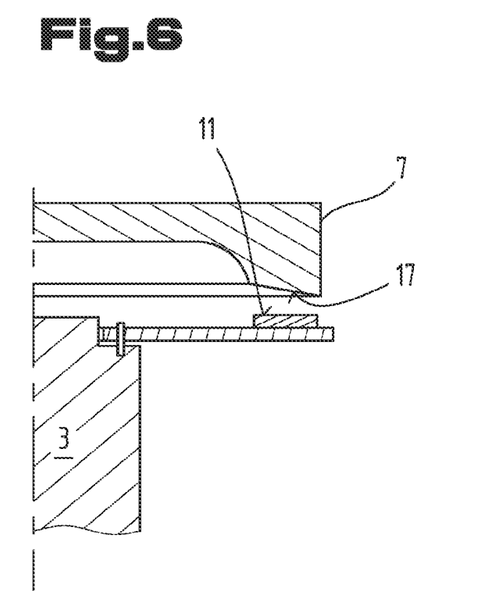
FIG. 6 a braking device in the released position.

While the embodiments according to FIGS. 5-7 have only a first friction surface and a mating surface, the variants of FIGS. 1-3 and FIGS. 8 and 9 show that the friction surface area 10 may have a second friction surface 12 configured on the second side of the brake disc 6 opposite to the first side. The friction surface area 10 of the brake disc 6 is arranged between the first mating surface 17 and a second mating surface 18 facing the second friction surface 12 and cooperating with the second friction surface 12 in the braking position.

The brake disc 6 has a disc-shaped base body 24. The first friction surface 11 and the second friction surface 12 are each formed by a preferably annular brake lining, which is applied to the base body 24 and/or projects in the axial direction beyond the base body 26 (FIG. 5-9).

The first mating surface 17 and the second mating surface 18 are each annular. Several interrupted, e.g. segment-like arranged counter surface areas would also be conceivable.

As can be clearly seen from FIG. 4, the friction surface area 10 is preferably arranged in the periphery of the brake disc 6. The first friction surface 11 and/or the second friction surface 12 may extend to the outer edge of the brake disc 6. The difference between the outer radius and the inner radius of the friction surface area 10 is preferably at most ⅓, preferably at most ¼, of the outer radius of the brake disc 6.

Figure 3:
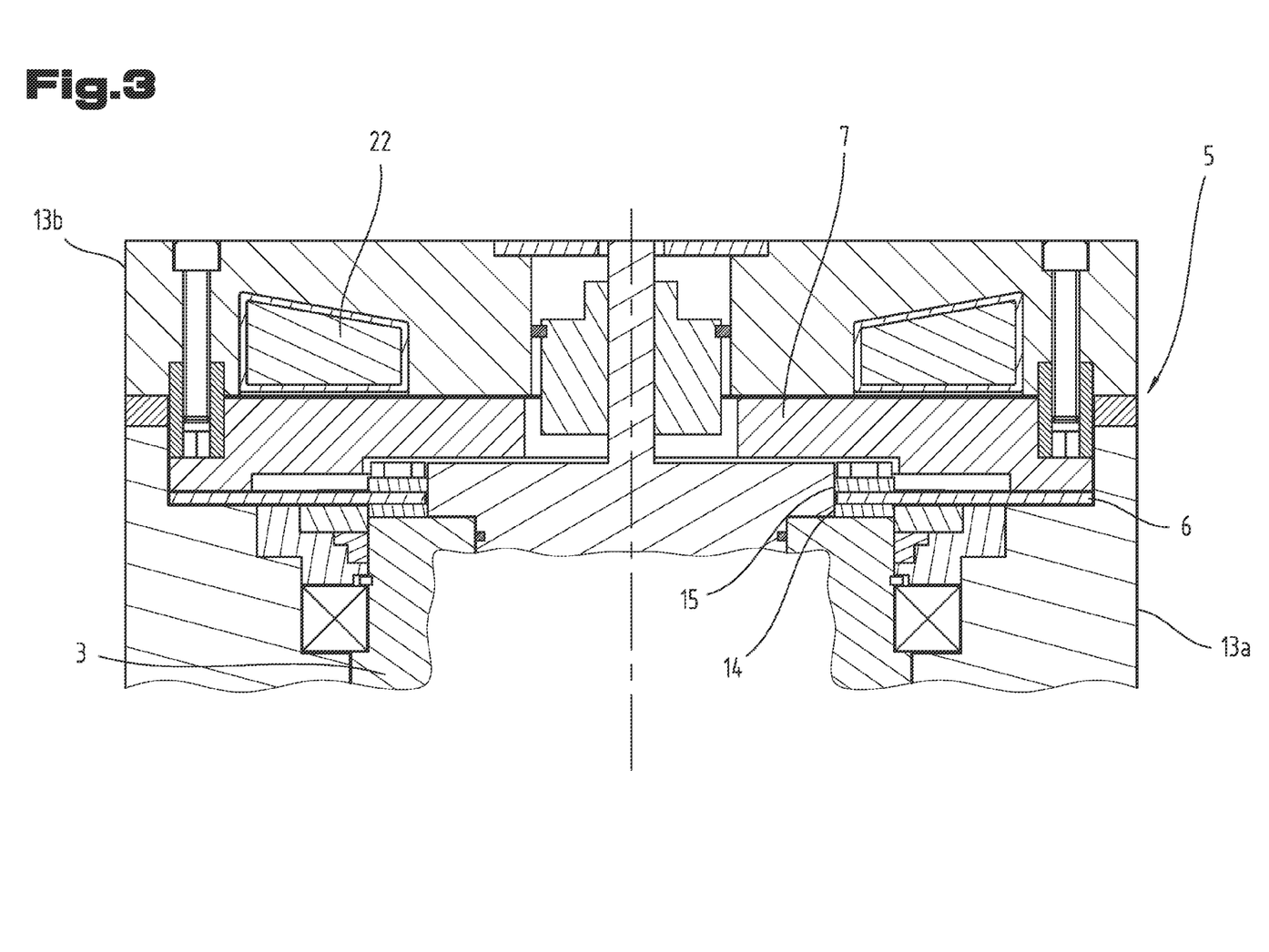
FIG. 3 a braking device in a cut view.

FIGS. 1 and 3 show that the electromechanical drive 1 has a (multi-part) housing 13. The second mating surface 18 may be formed on a housing part 13a or on an element that is firmly connected to the housing part 13a. In this way, the braking torque and the resulting frictional heat can be introduced directly into the housing.

In the embodiment shown in FIG. 4, the inner area 8 of the brake disc 6 has several, here annularly arranged, attachment interfaces 16, preferably in the form of holes, for attaching the brake disc 6 to the rotational part 3. Preferably, the number of attachment interfaces 16 is greater than 10 and/or greater than the number of cut-outs 19 in the deformation area. Due to a high number of fastening interfaces, a particularly precise adjustment of the brake disc relative to the mating surfaces is possible.

In the variants of FIGS. 6-9, in the released position of the braking device 5, the first friction surface 11 and the first mating surface 17 deviate from a parallel alignment. Similarly, the second friction surface 12 and the second mating surface 18 could deviate from a parallel alignment.

Preferably the distance between the first friction surface 11 and the first mating surface 17 decreases in the radial direction, this distance preferably being smaller at the radially outer edge of the first friction surface 11 by at most 1 mm, preferably by at most 0.2 mm, than at the radially inner edge of the first friction surface 11.

Figure 8:
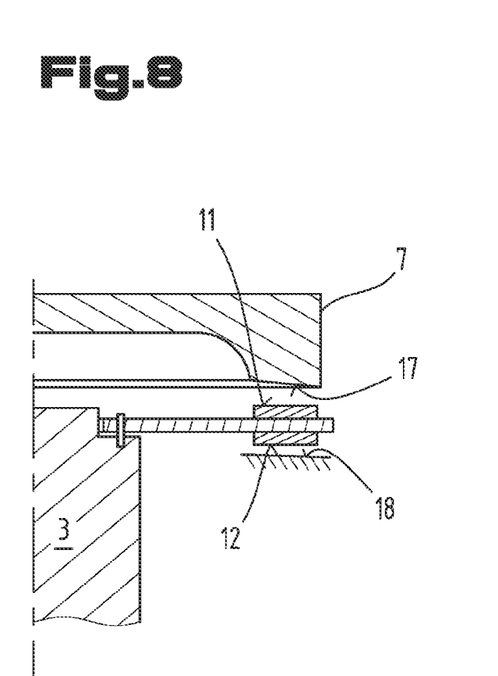
FIG. 8 a braking device with a second braking and mating surface in released position.

Similarly the distance between the second friction surface 12 and the second mating surface 18 decreases in the radial direction, this distance preferably being smaller at the radially outer edge of the second friction surface 12 by at most 1 mm, preferably by at most 0.2 mm, than at the radially inner edge of the second friction surface 12.

The friction surfaces and mating surfaces may be inclined to each other. The friction surfaces and mating surfaces may also have a curved shape in the radial direction.

Figure 2:
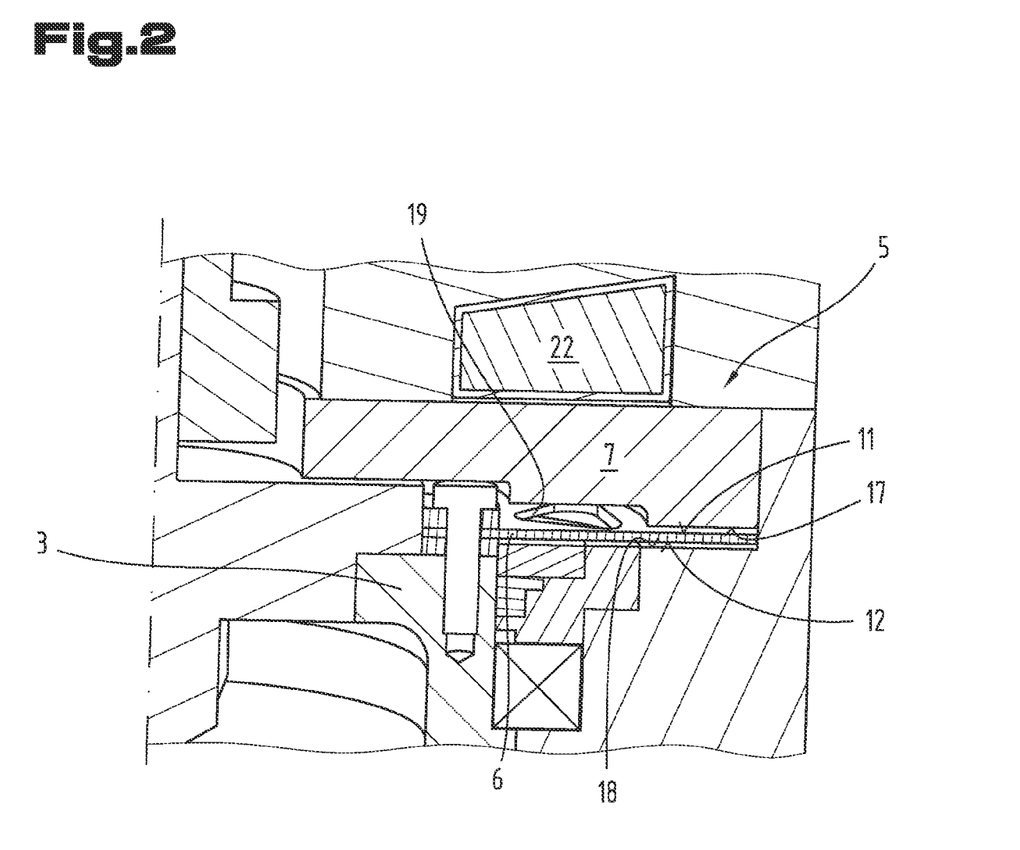
FIG. 2 a portion of a braking device with a perspective view.

As can be seen in particular from FIGS. 1-3, the inner area 8 of the brake disc 6 may be axially fixed to the rotational part 3. In the embodiments shown, the inner area 8 of the brake disc 6 is rigidly connected to the rotational part 3. This is done here by means of screws that protrude through the holes (attachment interfaces 16; see FIG. 4) and press the brake disc against the rotational part 3.

In the embodiment of FIG. 3, it can be seen that a first spacer ring 14 is arranged between the inner area 8 of the brake disc 6 and the rotational part 3. The inner area 8 of the brake disc 6 is also sandwiched between the first spacer ring 14 and a second spacer ring 15. This is done with the same screws as mentioned above that firmly connect the brake disc 7 to the rotational part 3.

In the preferred embodiment shown the electromechanical drive 1 is a spindle drive, wherein the rotational part 3 to which the brake disc 6 is connected is configured as a threaded nut which cooperates with the spindle 23 of the spindle drive. The lower end of the spindle 23 moves, when the motor is actuated and the threaded nut (rotational part 3) rotates, linearly downwards or upwards along the rotational axis 4 (FIG. 1).

Figure 10:
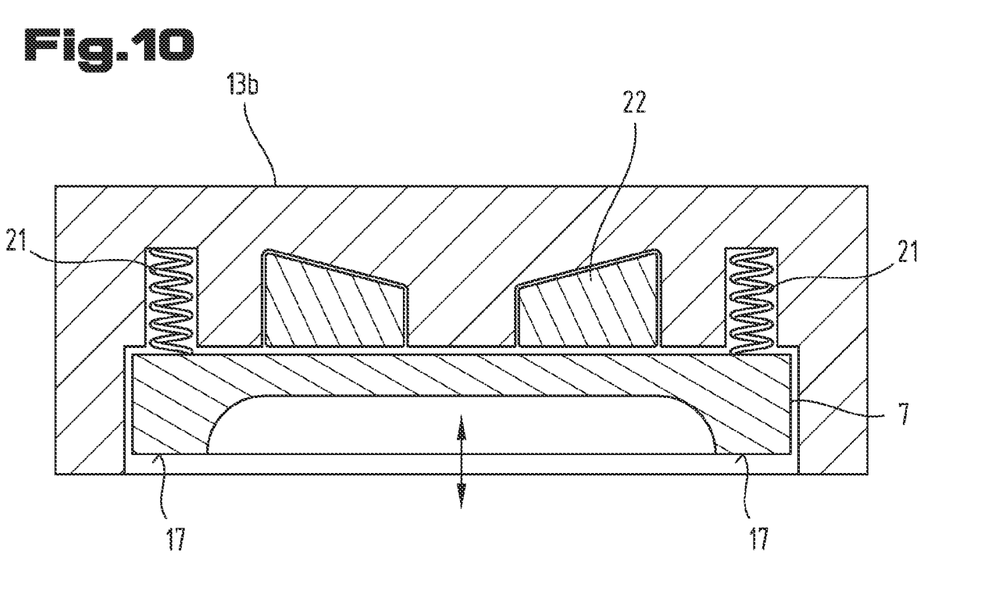
FIG. 10 a braking device with a preloaded braking element.
Figure 11:
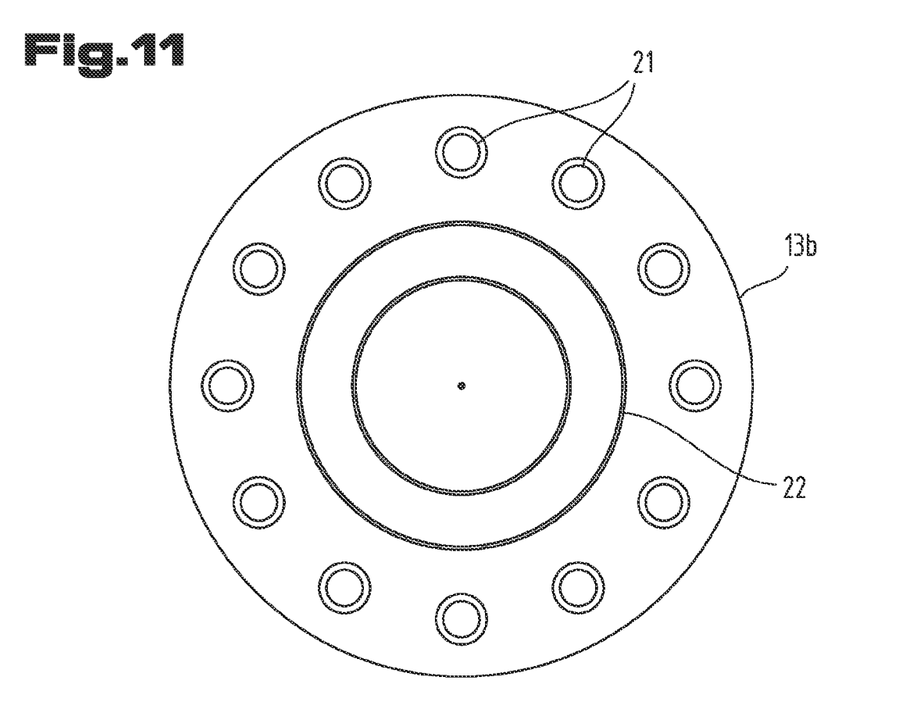
FIG. 11 a housing part with receptacles for springs and a receptacle for an actuator.

Preferably, the brake element 7 is biased towards the braking position. Finally, FIGS. 10 and 11 show that the braking element 7 is biased towards the braking position by a plurality of springs 21 arranged in an annular manner and preferably overlapping with the first mating surface 17.

The springs 21 may be inserted in a removable housing part 13b (e.g. in the form of a cover or a front cover) of the electromechanical actuator 1.

In FIGS. 1-3 and 10, it can be seen that the braking device 5 comprises an actuator 22, preferably in the form of an electromagnet, by means of which the braking element 6 can be brought into the released position and/or into the braking position. The actuator 22 as the springs 21 may be inserted in a removable housing part 13b of the electromechanical actuator 1.

Figure 12:
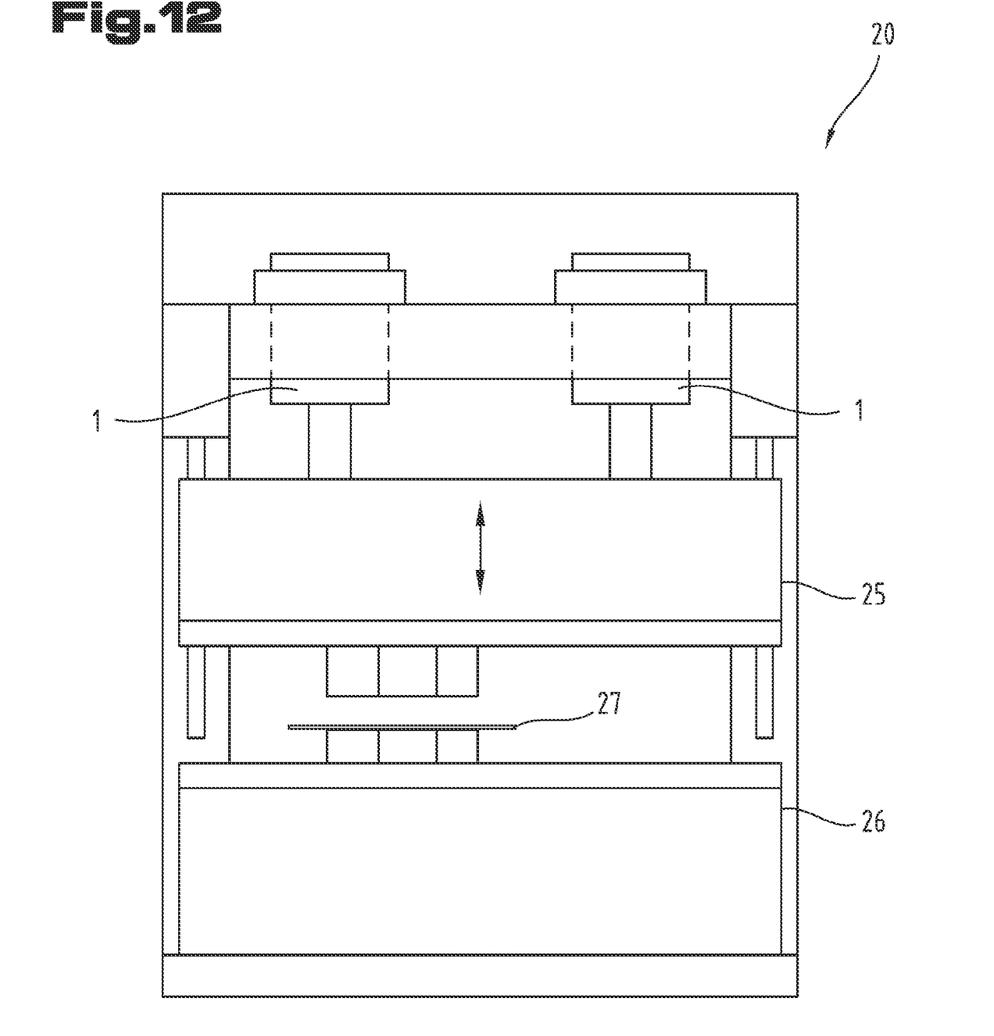
FIG. 12 a forming machine in the form of a bending press with electromechanical drives.

Finally, FIG. 12 shows a forming machine 20 in the form of a bending press, with at least one drive for the working movement (of a forming tool), in particular a press drive. The drive(s) are designed as electromechanical drive(s) 1 according to the invention. Such a forming machine may comprise a first (e.g. upper) tool carrier and a second (e.g. lower) tool carrier whose relative movement is the working movement. The electromechanical drive described above is particularly well suited for use in a bending machine, as the proposed braking device reacts in a particularly prompt way, thus reliably protecting the operating personnel in particular (especially in cases where a shutdown or a stop/slowdown of the working movement is relevant for safety) but also "protecting" workpieces from incorrect or faulty machining routines.

LIST OF REFERENCE SIGNS 1 electromechanical drive
2 motor
2a, 2b stator, rotor
3 rotational part
4 rotational axis
5 braking device
6 brake disc
7 braking element
8 inner area
9 intermediate area
10 friction surface area
11 first friction surface
12 second friction surface
13 housing
13a housing part
13b housing part
14 first spacer ring
15 second spacer ring
16 attachment interface
17 first mating surface
18 second mating surface
19 cut-outs
20 forming machine
21 spring
22 actuator
23 spindle
24 base body
25 first tool carrier
26 second tool carrier
27 workpiece

The invention claimed is:

1. An electromechanical drive (1) comprising
a motor (2),
a rotational part (3), said rotational part being rotatable by the motor (2) about a rotational axis (4), and
a braking device (5) that can be actuated between a braking position and a released position,
the braking device (5) having a brake disc (6) that rotates with the rotational part (3) and a braking element (7) that can be adjusted in the axial direction and acts on the brake disc (6) in the braking position,
wherein the brake disc (6) has
an inner area (8),
a friction surface area (10) extending annularly around the rotational axis (4) with a first friction surface (11) formed on a first side of the brake disc (6), and a second friction surface (12) formed on a second side of the brake disc (6) opposite the first side, and
an intermediate area (9) extending between the friction surface area (10) and the inner area (8) around the rotational axis (4),
and wherein a first mating surface (17) is formed on the braking element (7), which mating surface faces the first friction surface (11) and interacts with the first friction surface (11) in the braking position, and
wherein the friction surface (10) of the brake disc (6) is arranged between the first mating surface (17) and a second mating surface (18) which faces to the second friction surface (12) and cooperates with the second friction surface (12) in the braking position,
wherein the intermediate area (9) is a deformation area that is elastically deformable in the axial direction by the action of the braking element (7) on the brake disc (6), and
wherein, in the released position of the braking device (5), the first surface (11) and the first mating surface (17) deviate from a parallel alignment and/or are inclined towards each other and/or the second friction surface (12) and the second mating surface (18) deviate from a parallel alignment and/or are inclined towards each other.

2. The electromechanical drive according to claim 1, wherein the intermediate region (9) of the brake disc (6), both in the released position and in the braking position, is free of contact with the braking element (7) and/or wherein in the braking position the contact of the braking element (7) with the brake disc (6) is limited to the first friction surface (11).

3. The electromechanical drive according to claim 1, wherein cut-outs (19), preferably in the form of perforations, and/or material weakenings are formed in the deformation area.

4. The electromechanical drive according to claim 3, wherein in the deformation area, the total area of the cut-outs (19) is at least as large as the total area occupied by the remaining material.

5. The electromechanical drive according to claim 1, wherein the first mating surface (17) is annular and/or wherein the second mating surface (18) is annular.

6. The electromechanical drive according to claim 1, wherein the friction surface area (10) is arranged in the periphery of the brake disc (6), preferably the first friction surface (11) and/or the second friction surface (12) extending to the outer edge of the brake disc (6).

7. The electromechanical drive according to claim 1, wherein the difference between the outer radius and the inner radius of the friction surface area (10) is at most ⅓, preferably at most ¼, of the outer radius of the brake disc (6).

8. The electromechanical drive according to claim 1, wherein the electromechanical drive (1) has a housing (13) and wherein the second mating surface (18) is formed on a housing part (13a) or on an element firmly connected to the housing part (13a).

9. The electromechanical drive according to claim 1, wherein the inner region (8) of the brake disc (6) has at least one, preferably several, preferably annularly arranged, attachment interfaces (16), preferably in the form of holes, for attaching the brake disc (6) to the rotational part (3), wherein preferably the number of attaching interfaces (16) is greater than 10 and/or greater than the number of cut-outs (19) in the deformation area.

10. The electromechanical drive according to claim 1, wherein
the distance between the first friction surface (11) and the first mating surface (17) decreases in the radial direction, wherein preferably this distance is smaller at the radially outer edge of the first friction surface (11) by at most 1 mm, preferably by at most 0.2 mm, than at the radially inner edge of the first friction surface (11),
and/or the distance between the second friction surface (12) and the second mating surface (18) decreases in the radial direction, wherein preferably this distance is smaller at the radially outer edge of the second friction surface (12) by at most 1 mm, preferably by at most 0.2 mm, than at the radially inner edge of the second friction surface (12).

11. The electromechanical drive according to claim 1, wherein the first friction surface (11) and/or the first mating surface (17) have a curved shape in the radial direction and/or wherein the second friction surface (12) and/or the second mating surface (18) have a curved shape in the radial direction.

12. The electromechanical drive according to claim 1, wherein the inner area (8) of the brake disc (6) is axially fixed to the rotational part (3) and/or wherein the inner area (8) of the brake disc (6) is rigidly connected to the rotational part (3), preferably by screws.

13. The electromechanical drive according to claim 1, wherein a first spacer ring (14) is arranged between the inner region (8) of the brake disc (6) and the rotational part (3), wherein preferably the inner region (8) of the brake disc (6) is constrained between the first spacer ring (14) and a second spacer ring (15), preferably by screws.

14. The electromechanical drive according to claim 1, wherein the electromechanical drive (1) is a spindle drive, wherein the rotational part (3) to which the brake disc (6) is connected is configured as a threaded nut which cooperates with the spindle (23) of the spindle drive.

15. The electromechanical drive according to claim 1, wherein the brake disc (6) has a disc-shaped base body (24) and wherein the first friction surface (11) and/or the second friction surface (12) are formed by a preferably annular brake lining which is applied to the base body (24) and/or projects in the axial direction beyond the base body (26).

16. The electromechanical drive according to claim 1, wherein the brake element (7) is biased towards the braking position.

17. The electromechanical drive according to claim 16, wherein the braking element (7) is biased towards the braking position by a plurality of springs (21) arranged in an annular manner and preferably overlapping with the first mating surface (17).

18. The electromechanical drive according to claim 17, wherein the springs (21) are inserted in a removable housing part (13b) of the electromechanical drive (1).

19. The electromechanical drive according to claim 1, wherein the braking device (5) comprises at least one actuator (22), preferably in the form of an electromagnet, by means of which the braking element (6) can be brought into the released position and/or into the braking position, wherein preferably the actuator (22) is inserted in a removable housing part (13b) of the electromechanical drive (1).

20. The electromechanical drive according to claim 1, wherein the motor (2) and the braking device (5) are housed in a common housing (13).

21. A forming machine (20), in particular a bending machine, preferably a bending press, with at least one drive for the working movement, in particular a press drive, wherein the at least one drive is an electromechanical drive (1) according to claim 1.

* * * * *